Nov. 13, 1928.
C. F. JENKINS
DEPTH METER
Filed Sept. 29, 1923
1,691,719
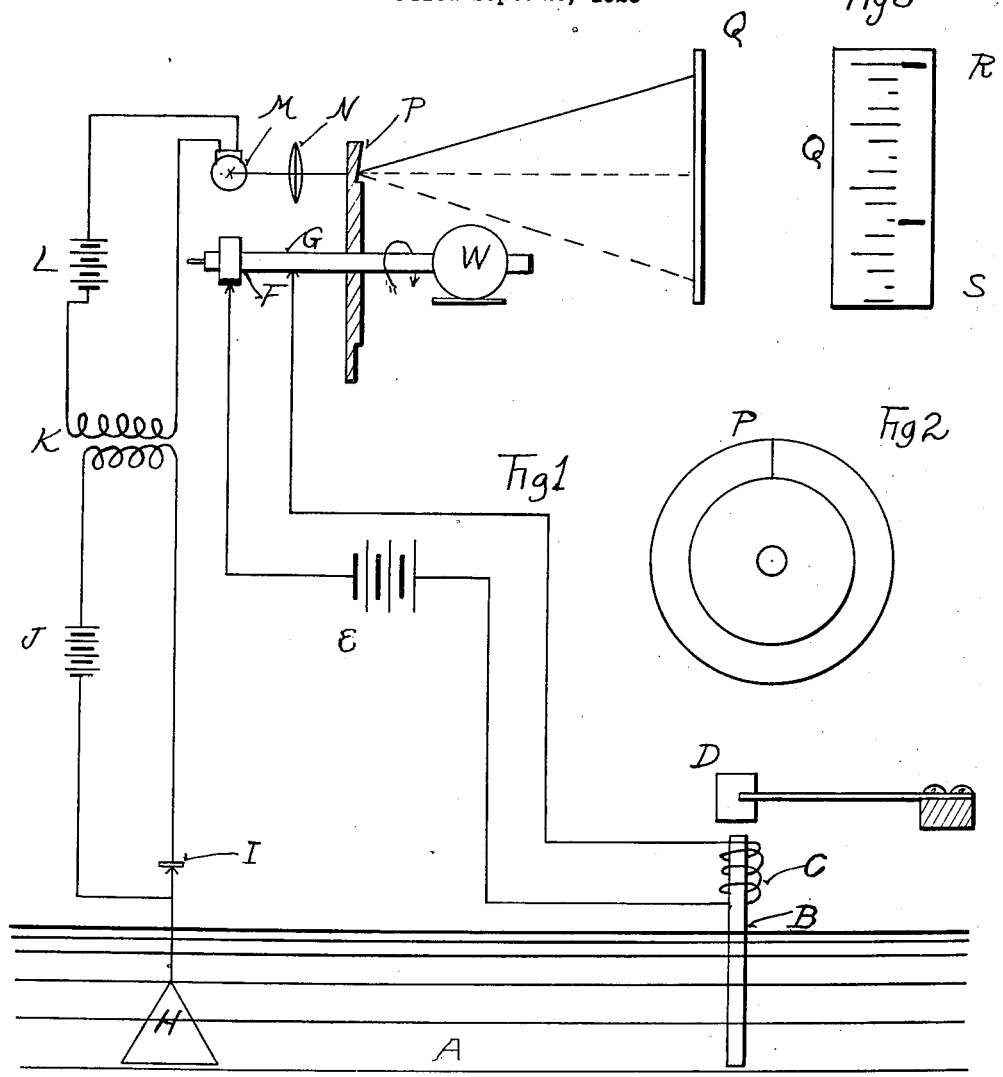

Patented Nov. 13, 1928.

1,691,719

UNITED STATES PATENT OFFICE.

CHARLES FRANCIS JENKINS, OF WASHINGTON, DISTRICT OF COLUMBIA.

DEPTH METER.

Application filed September 29, 1923. Serial No. 665,729.

This invention relates to sound devices, and has for its principal object means, carried by a ship, for continuous and direct readings as the ship is navigating relatively shallow water; also warning of the proximity of icebergs derelicts, etc., during foggy weather.

These and other objects are attained by the methods and devices described in the following specifications, set forth in the claim, and illustrated in the accompanying drawings, in which Fig. 1 is diagrammatic illustration of the apparatus employed; and Figs. 2 and 3 details thereof.

In the drawings A represents the sea; B an iron bar partially immersed therein; the upper end of which is enclosed in a solenoid, C. Elastically supported above the end of the bar B is an iron hammer D. In circuit with the solenoid C is a battery E, and a commutator F on the shaft G.

In the sea is a metal receiving device H, making contact therewith is a terminal I, a carbon button, for example. In an electric circuit with the microphone I is a battery J and the primary of an induction coil K. The secondary of this coil is in circuit with the battery L and a lamp M, located in axial alignment with the lens N. The current of the lamp circuit is normally not sufficient to cause the lamp to glow sufficiently to illuminate the calibrated scale, but when the current of the lamp circuit is increased by the operation of the induction coil or transformer, the lamp will be caused to flash and glow with sufficient intensity to illuminate the scale.

On the shaft G is mounted a prismatic-ring disc P (drawn in section in Fig. 1 and in elevation in Fig. 2), described in Patent No. 1,385,325, the rotation of which gives to a ray, or a beam, of light passing therethrough a hinged or oscillating motion. In the axial line of the lens N and the light M and the median line of the prismatic ring P is located a surface Q; upon which a scale is drawn, as shown in Fig. 3. An electric motor W is directly connected to shaft G.

The operation of the device is as follows: The disc P being put in motion, by the motor W, contact will be made at the commutator F, completing the circuit through the battery E and the solenoid C, magnetizing the bar B and causing the hammer D to strike thereon. The shock is communicated to the water and varies the current in the circuit I J K, increasing the normal current in the circuit K L M, momentarily increasing the intensity of the illumination of the lamp M. As the contact at F occurs when the prism is in the position shown, (maximum angle) the light will be imaged on the scale at R. When the sound of the blow of the hammer on the bar B is reflected from the shallow bottom of the sea the echo will act on the microphone I, as did the initial sound of the blow, and the lamp will again be lighted. But as the prismatic ring has meantime changed the angle between its faces, by reason of its rotation, the light image will strike the scale at a position lower down, as at S indicating ten fathoms of depth. The speed of the motor is known, and is constant, and the calibration of the scale is made to correspond.

As the speed of the motor is such that the scale can be long enough to make easy the reading of fathoms therefrom. And as this speed is beyond the range of persistence of vision, a tenth of a second or less, the spot at the top of the scale appears continuous; and as it always occurs at the initial end of the prism the light spot appears stationary at the top of the scale. The other spot (at S) also appears continuous because it also occurs in less than one-tenth second, but as it indicates the changing depth of the sea, the spot moves up and down the scale to indicate this changing depth. With a device sending ten signals per second it will be apparent that it can be employed for measuring distances through which sound can travel in one-tenth of a second.

The result is a constant and direct visual indication of the depth of the sea at all times. The appearance of the spot at the top of the scale indicates an instrument in good, working order.

It is obvious that the use of this device in the deep water of the open sea is not needed for the measurement of the depth of the sea for safe navigation, but when the ship is enveloped in fog the instrument, the subject of this application, would, by reflection of sound therefrom, indicate the presence of icebergs, other ships, derelicts, or the like.

Also quite as obviously with the sound parts of one of these instruments located on each side of the ship, and the scales located adjacent each other in the navigator's room, indication would be given by the relative positions of the "S" spots whether the iceberg was on the port or the starboard bow.

It will readily be noted that any distance, or the length of anything, can be measured by this echo method, and, therefore, I do not wish to limit myself to measurements in sea water, for it can be applied to the measurement of distances in air, in earth, in metals, woods, etc. The most important element consists of means for measuring very small distances, with separations easily read, and means whereby these readings can be continuous and direct-readings.

It would be possible to have the light practically continuous, being "flashed" out with the sound and the echo, the momentary dark flashes appearing on the scale to indicate time and distance instead of brief light flashes. (By the word "flashes" or its equivalent is meant indications of the effect, on the light, of the sound and of the echo.)

What I claim, is—

In a device for measuring distances, a stationary calibrated scale, a lamp, a lens for imaging the light from the lamp upon the scale, sound producing means, a rotatable member including light refracting means interposed between the lens and the calibrated scale for moving the image along the scale, means for rotating the light refracting member and actuating the sound producer to produce impulses in synchronism with the rotation thereof, sound response receiving means and a circuit connected therewith including means for flashing the lamp upon the reception of a sound impulse.

In testimony whereof I have affixed my signature.

CHARLES FRANCIS JENKINS.